2,990,580
PROCESS FOR IMPROVING BURSTING STRENGTH OF POLYETHYLENE PIPE

Samuel Phillip Foster, Wilmington, Del., assignor to E. I. du Pont de Nemours and Company, Wilmington, Del., a corporation of Delaware
No Drawing. Filed June 4, 1956, Ser. No. 588,995
7 Claims. (Cl. 18—55)

This invention relates to plastic tubing, pipe, continuous hollow structures, and the like, prepared from the normally solid polyethylenes and also to treatment of the formed polyethylene product to increase normal life thereof.

In the extrusion molding of thermoplastic materials, such as cellulose acetate, cellulose acetobutyrate, polystyrene and the like, the thermoplastic material, as a powder, is usually charged into an apparatus in which it is heated to a semi-plastic or molten state. While in that state the material is forced through a die having a ring-shaped, or similar nozzle, and as the plastic issues from the nozzle, it is frozen in the extruded shape by cooling.

Melt extrusion processes for the formation of polyethylene pipe or tubing have been in commercial production for several years. The market has increased rapidly from a few million to many million pounds per year. The advantages that polyethylene pipe has over metallic pipe are, inter alia, light-weight, ease of installation, resistance to corrosion, and a property it shares with certain other plastic pipes, a much lower pressure drop in fluid flow. A disadvantage of polyethylene pipe heretofore used in that it tends to crack under certain environmental and use conditions when subjected to biaxial stress below the normal crystalline yield point of the polymer.

The high molecular weight normally solid polyethylenes differ in one important property from many other thermoplastic polymers. Such polyethylenes are drawable (orientable), i.e., upon being subjected to tensile stress, they will stretch and set in the stretched condition. These drawable forms of polyethylene may be prepared by the so-called high pressure process as described in the Fawcett et al. U.S. Patent 2,153,553 which produces branched-chain polymers of ethylene with densities between 0.91 and 0.93. Not all such polymers are suitable for the preparation of polyethylene pipe and of the drawable polyethylene of the high pressure type—that most suitable has a weight average molecular weight ($\overline{M}_w$) above about 200,000.

A more recently publicized polyethylene, superior in melting point, tensile strength, permeability, and other properties, to the Fawcett et al.-type polyethylene, was first described in the Larchar and Pease British Patent 639,036 of June 28, 1950, and in the E. I. du Pont de Nemours and Company British Patent 682,420 of November 12, 1952. This type of thermoplastic will produce superior pipe and especially from the drawable linear polymers of ethylene having a density between 0.94 and 0.97, with $\overline{M}_w$ between 50,000 and about 200,000 or higher. Moreover, when pipe is made from this polymer and then treated in accord with the process of the invention, many of the undesirable properties inherent in the commercial polyethylene pipe currently on the market are corrected.

It is well known that the stretched or drawn polyethylene has greater strength in tension than the unstretched or undrawn polymer. In the preparation of polyethylene pipe by, for example, the extrusion molding processes of the art, or by cold extrusion of a bar or tube through a die, the normal assumption has been that a pipe in which the plastic was biaxially, i.e. longitudinally and circumferentially, fully orientated or stretched, would be of optimum strength. The invention is directed to the preparation of polyethylene pipe having optimum strength in contradistinction to such teachings.

An object of the invention is to provide a process for producing polyethylene tubing, pipe and the like having superior stress resistance. Yet another object is to provide a process for improving the bursting strength of polyethylene pipe. Still another object is to provide a post-thermal treatment of extruded polyethylene pipe, and to provide the pipe thereby produced. Other objects and advantages of the invention will hereinafter appear.

The above and other objects are realized in accord with the invention by a three-step process. In the first step drawable polyethylene resin is melt extruded through a ring-shaped extrusion nozzle from which the resin issues in the shape of a seamless, hollow shape such as tubing, pipe, etc. In the second step the extruded shape is immersed in a quenching bath of water or other non-solvent of the polymer to freeze the polymer in the extruded shape. While this step is included in the preferred three-step process of the invention and is essential to practical, commercial operation of the process, other methods of freezing the polymer to insure shape stability may be used, such as a blast of a cold inert gas against the polymer surface, a cold transfer surface in contact with the extruded polymer or the like. In the third step, the thus formed polyethylene is subjected to post-thermal treatment (i.e. thermal treatment following melt extrusion and quenching of the extruded shape), whereby, and in accord with the principal feature of the invention, the tube, pipe or other hollow shape has imparted to it not only the known superior properties possessed by the normally solid polymers of ethylene, but also has imparted to its superior resistance to failure and fatigue when subjected to severe static or dynamic forces while in use.

Extensive research has revealed that it is impractical to produce tubing or polyethylene resin that has equal coaxial orientation. Unequal stress or orientation in coaxial directions is, these studies have shown less desirable than no orientation at all. By the process of the invention the tube-like extruded shape is transferred directly after extrusion to a quenching bath in which the polymer is frozen at the exterior surface of the shape, the freezing of the polymer progressing toward the core of the shape. Polyethylene is a god heat insulator and, as a consequence, while the surface of the shape will be rapidly cooled, the inner surface of the shape will be more slowly cooled. Due to this differential cooling, a stress gradient is set up between the outer surface and the inner surface of the shape. By and large the polymer in proximity to the inner surface is in a substantially unstressed state, while the polymer in proximity to the outer surface of the shape is in a highly stressed state.

The third or post-thermal treating step of the process effects a rapid relaxation of the stresses in the outer surface of the shape without substantial modification of the practically fully relaxed polymer close to the core or inner surface. As a result of post-thermal treatment following the quenching operation, a product is made with a substantially unstressed polymer gradient throughout the cross section of the shape. Moreover, the process of the invention, by this post-thermal treatment, utilizes the principle of relaxation of a polymer by remelting, but only remelting the outer layers of the shape to such an extent that the relaxed portion of the polymer situated close to the inner surface, is not melted but is used to give form stability to the shape during this treatment.

Any normally solid polymer of ethylene may be treated to produce hollow continuous shapes by the process of the invention, such as those referred to above. The invention is directed to the use of drawable polyethylenes having densities between 0.91 and 0.97. Preferred polymers of the branched-chain type are those having densities from about 0.91 to about 0.93 and with $\overline{M}_w$ above 200,000. However, the optimum polymers for use in the invention are the drawable linear polyethylenes having densities between about 0.94 and about 0.97 and with $\overline{M}_w$ between 50,000 and 200,000 and above.

The post-thermal treatment is conducted at temperatures above the melting point of the particular polymer used. The shape during post-thermal treatment is immersed in a fluid bath for a sufficient length of time to melt the outer surfaces only and thereby to reduce the surface stresses and orientation of the polymer to substantially that of an annealed compression molded sample of the same polymer. The temperature of the fluid post-thermal bath should be from 5 to 10° C. up to about 50° C. above the melting point of the polymer. At temperatures between 120° C. and 160° C. the treatment is, for optimum results and depending on the wall thickness of the shape, concluded after 20 to 45 seconds. Higher temperatures may be used if the treatment is of a sufficiently short duration to avoid deformation due to solid phase flow of the polymer in the shape. By this treatment the cross-section of the polyethylene shape has been uniformly relaxed and a product produced markedly improved in its resistance to coaxial stresses.

Melt extruded, water quench pipe, 1" in diameter, was immersed in a well stirred bath of ethylene glycol for the periods of time and the temperatures shown in Table I. The pipes were then removed from the bath, placed in water ca. 35° C. until cool, rinsed with fresh water and dried in air at room temperature. Polymer A was a pipe produced from polyethylene having a density of 0.923 and $\overline{M}_w$ above 200,000, and polymer B, a pipe produced from linear polyethylene having a density of 0.94 and $\overline{M}_w$ of 150,000.

*Table I*

| Temperature, °C. | Polymer | Time (sec.) | Percent Elongation in the Axial Direction |
|---|---|---|---|
| No treatment | A | 0 | 175. |
| 150 | A | 2 | 400. |
| 150 | A | 5 | 480. |
| 150 | A | 10 | 510. |
| 145 | A | 60 | Sample deformed. |
| No treatment | B | 0 | 140. |
| 155 | B | 60 | 590. |

The percentage elongation was measured on test specimens stamped from the pipe, and the percent elongations were determined by a Scott Tensile Tester at a crosshead pull rate of 2"/min. for polymer A and 10"/min. for polymer B.

The marked increase in elongation is due to relaxed orientation or to relaxed frozen-in stress. This relaxation eliminates the major amount of orientation in such shapes, gives a uniform stress gradient between the inner and outer surfaces of the shape, and also effectively eliminates extrusion variables. In any event, the bursting strength and coaxial strength of such shapes are markedly improved by the post-thermal treatment of the invention and are in direct proportion to the percentage elongation.

The temperature of the heating medium used in the third-step treatment is quite critical, for a temperature that is too low will either not remove the orientation and stress or will do so at an uneconomical rate, while a temperature that is too high deforms and/or utterly destroys the pipe. The temperature of the medium used should be above the melting temperature of the polymer and the time the polymer is in contact with the heating medium must conform with that necessary to give relaxation of the surface without deformation of the shape.

A criterion of the proper time-temperature treatment is that the elongation of tensile specimens taken longitudinally and others taken circumferentially will be substantially equal and of about the same magnitude as that for the elongation of stress-free tensile specimens of the same polymer compression molded under normal conditions of pressure and temperature.

Any suitable bath may be used for the immersion post-thermal treatment providing the fluid is a non-solvent of the polymer. The glycols, glycerine, mercury, nitrogen, and carbon dioxide are examples of the medium that may be used for the post-thermal treatment baths. Water may also be used, but it required the use of pressure to give the bath a sufficiently high temperature. A non-oxidizing flame may also be used. Steam and preferably superheated steam, is particularly well adapted for the post-thermal treatment of these polymers.

In Table II are given physical data of pipe prior to and subsequent to post-thermal treatment in accord with a preferred embodiment of the invention. The post-thermal treatment of the pipe, described in Table II, comprised immersing the pipe into a stirred bath of ethylene glycol at 150° C. for approximately 30 seconds. The pipe was then removed from the hot bath, immersed in water at 35° C. until cool, rinsed with fresh water and then dried in air.

*Table II*

| | Base Resin Density at 23° C. | M.I.[1] | Additive, Percent | Compression Molded | | | Pipe—As Extruded | | | | | | Pipe—Post-Thermal Treatment | | | | | |
|---|---|---|---|---|---|---|---|---|---|---|---|---|---|---|---|---|---|---|
| | | | | | | | Longitudinal | | | Circumferential | | | Longitudinal | | | Circumferential | | |
| | | | | Yield, p.s.i. | Tensile, p.s.i. | Elong., Percent | Yield, p.s.i. | Tensile, p.s.i. | Elong., Percent | Yield, p.s.i. | Tensile, p.s.i. | Elong., Percent | Yield, p.s.i. | Tensile, p.s.i. | Elong., Percent | Yield, p.s.i. | Tensile, p.s.i. | Elong., Percent |
| 1 | 0.9223 | 0.46 | None | 1,650 | 2,280 | 600 | 1,581 | 1,786 | 348 | 1,358 | 1,975 | 453 | 1,489 | 2,423 | 550 | 1,533 | 2,160 | 507 |
| 2 | 0.9234 | 2.27 | None | 1,609 | 1,875 | 503 | 1,417 | 1,425 | 188 | 1,279 | 1,489 | 385 | 1,442 | 1,945 | 545 | 1,395 | 1,842 | 480 |
| 3 | 0.9230 | 2.17 | [2] 2½ | 1,539 | 1,896 | 495 | 1,485 | 1,727 | 437 | 1,396 | 1,649 | 457 | 1,439 | 1,776 | 453 | 1,391 | 1,806 | 447 |
| 4 | 0.9230 | 1.09 | [2] 2½ | 1,639 | 1,959 | 492 | 1,493 | 1,526 | 200 | 1,483 | 1,488 | 350 | 1,510 | 1,971 | 494 | | | |
| 5 | 0.9230 | 0.38 | [3] 3 | 1,460 | 1,960 | 540 | 1,354 | 1,354 | 157 | 1,166 | 1,247 | 255 | 1,656 | 1,983 | 440 | 1,554 | 1,849 | 450 |

[1] A.S.T.M. D-1238.52T.
[2] Carbon black.
[3] Butyl rubber.

Probably one of the best practiced measures of the utility of plastic pipes, tubes, and like shapes, is the time-to-failure under stress. This is often referred to as fatigue. Table III illustrates the surprising results obtained by the process of the invention. The pipes of the table were treated in a manner similar to those described in Table II. It will be noted that at 700 p.s.i., these utility increases over the untreated pipe were realized—for pipe W $$\frac{340}{16} = 21 \times$$

pipe X $$\frac{3700+}{137} = 27 \times$$

and for pipe Y $$\frac{800}{0.5} = 1600 \times$$

(time at failure of pipe after post-thermal treatment is divided by time at failure of pipe as extruded; values taken from Table III). Pipe Z at 1000 p.s.i. was still under test after $$\frac{583+}{354} = 1.6 \times$$

the time-to-failure treatment of the same untreated pipe. The yield, tensile and elongation values were determined by a Scott Tensile Tester at a cross-head pull rate of 2″/min. for all resins described in Table II and for resins W, X, and Y in Table III; in testing resin Z a pull rate of 10″/min. was used.

Table III

| | Density at 23° C. | M.I.[1] | Additive, Percent | Pipe as Extruded—Time-to-Failure (Hours)—Hoop Stress Level[4] | | | | Pipe After Post-Thermal Treatment—Time-to-Failure (Hours)—Hoop Stress Level[4] | | | |
|---|---|---|---|---|---|---|---|---|---|---|---|
| | | | | 1,000 p.s.i. | 900 p.s.i. | 800 p.s.i. | 700 p.s.i. | 1,000 p.s.i. | 900 p.s.i. | 800 p.s.i. | 700 p.s.i. |
| W | 0.9230 | 1.95 | 2½[2] | | | 1 | 16 | | | 3.2 | 340 |
| X | 0.9230 | 2.1 | 2½[2] | | 0.03 | 0.4 | 137 | | 0.04 | 1.7 | 3,700 |
| Y | 0.9230 | 0.43 | 10[3] | | | 0.3 | 0.5 | | | 35 | 800 |
| Z | 0.9437 | 0.46 | | 354 | | 473 | | 583[5] | | 828[5] | |

[1] A.S.T.M. D-1238.52T.
[2] Carbon black.
[3] Finely divided silicon dioxide ("Cab-O-Sil").
[4] $\frac{\text{Hydraulic pressure} \times \text{diameter}}{2 \times \text{wall thickness}}$
[5] Test in progress.

While the invention is directed principally to the post-thermal treatment of polyethylene per se, whether linear or branched-chain in its chemical structure, the invention is also adapted to the treatment of its copolymers with other polymerizable monomers such as the higher olefins, propylene, butylene, isobutylene, etc. as well as the dienes, butadiene, isoprene, etc. or the mixtures of the linear and branched-chain polyethylenes. The polyethylenes or mixtures may also contain fillers such as carbon black, glass fibers, etc.

$\overline{M}_w$, as used in this specification and its attached claims, designates weight average molecular weight as defined by Paul J. Flory in "Principles of Polymer Chemistry," Cornell University press, 1953, pages 292, et seq.

I claim:

1. In a process for increasing the bursting strength of extruded polyethylene pipe, the steps which comprise extruding polyethylene pipe from a melt of the polymer, quenching the extruded polymer to a shape stable form so that the exterior is longitudinally strained, thereafter heating the external surface of the polymer to a temperature and for a time sufficient to relax the outer surface of the polymer while maintaining and stabilizing the pipe shape during the surface heat treatment by the relaxed portion of the polymer situated close to the inner surface of the pipe.

2. The process of claim 1 in which the thermal treatment, after quenching, is of sufficient intensity to heat the exterior surface of the pipe to a temperature above the melting point of the polyethylene, the inner surface stabilizing the form of the pipe.

3. The process of claim 1 in which the pipe is extruded from a drawable branched-chain polyethylene having a density between 0.91 and 0.93 and a $\overline{M}_w$ of more than 200,000.

4. The process of claim 1 in which the pipe is extruded from a drawable linear polyethylene having a density between 0.94 and 0.97 and a $\overline{M}_w$ between 50,000 and 200,000.

5. The process of claim 1 in which the extruded pipe, after quenching, is post-thermally treated in a bath of a non-solvent for polyethylene, maintained at a temperature from 5–50° C. above the melting point of the polyethylene for a period of time of sufficiently long duration to melt the outer surface only, and of sufficiently short duration to avoid deformation of the pipe due to solid phase flow of the polyethylene.

6. A process for increasing the biaxial stress strength of extruded polyethylene pipe which comprises extruding the polyethylene pipe, quenching the extruded polymer to a shape stable form so that the exterior is longitudinally strained, and then heating the outside wall surface of the extruded and stressed pipe of polyethylene, 5–50° C. above the melting point of the polyethylene for a period of time of sufficiently long duration to melt the outer surface only, and of sufficiently short duration to avoid deformation due to solid phase flow of the polyethylene.

7. In a process for increasing the bursting strength of polyethylene pipe, the steps which comprise extruding polyethylene pipe from a melt of the polymer, quenching the extruded pipe to a shape stable form so that the exterior is longitudinally strained, thereafter subjecting the resulting pipe to further treatment in a non-solvent liquid for polyethylene maintained at a temperature of 5° C. to 50° C. above the melting point of the polyethylene for a period of time of sufficiently long duration to melt the outer surface of the pipe, and sufficiently short duration to avoid deformation of the pipe due to solid phase flow of the polyethylene.

References Cited in the file of this patent

UNITED STATES PATENTS

| | | |
|---|---|---|
| 2,205,449 | Wiley | June 25, 1940 |
| 2,325,060 | Ingersoll | July 27, 1943 |
| 2,431,042 | Ingersoll | Nov. 19, 1947 |
| 2,632,921 | Kreidl | Mar. 31, 1953 |
| 2,648,097 | Kritchever | Aug. 11, 1953 |
| 2,753,596 | Bailey | July 10, 1956 |
| 2,763,029 | Tulloss | Sept. 18, 1956 |